(12) United States Patent
Lin et al.

(10) Patent No.: US 11,196,574 B2
(45) Date of Patent: Dec. 7, 2021

(54) PHYSICALLY UNCLONABLE FUNCTION (PUF) GENERATION

(71) Applicant: Taiwan Semiconductor Manufacturing Company, Ltd., Hsinchu (TW)

(72) Inventors: Chien-Chen Lin, Hsinchu (TW); Wei Min Chan, Hsinchu (TW); Chih-Yu Lin, Hsinchu (TW); Shih-Lien Linus Lu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 511 days.

(21) Appl. No.: 16/045,066

(22) Filed: Jul. 25, 2018

(65) Prior Publication Data

US 2019/0058603 A1   Feb. 21, 2019

Related U.S. Application Data

(60) Provisional application No. 62/546,726, filed on Aug. 17, 2017.

(51) Int. Cl.
*H04L 9/32* (2006.01)
*H04L 9/08* (2006.01)
(Continued)

(52) U.S. Cl.
CPC .............. *H04L 9/3278* (2013.01); *G11C 7/06* (2013.01); *G11C 7/24* (2013.01); *G11C 8/10* (2013.01);
(Continued)

(58) Field of Classification Search
CPC . H04L 9/3278; H04L 9/0866; H04L 2209/12; G11C 7/06; G11C 7/24;
(Continued)

(56) References Cited

U.S. PATENT DOCUMENTS 5,168,467 A  * 12/1992 Fukushi ................. G11C 7/062
                                                    365/189.06
5,828,614 A    10/1998 Gradinariu
(Continued)

FOREIGN PATENT DOCUMENTS

KR   10-1998-0081090 A   11/1998
KR   10-2003-0020913 A    3/2003
KR   10-2008-0100474 A   11/2008

OTHER PUBLICATIONS

Dosi-6T SRAM 1Mb Design with Test Structures and Post Silicon Validation, Aug. 2017, pp. 1-79 (Year: 2017).*
(Continued)

*Primary Examiner* — Luu T Pham
*Assistant Examiner* — James J Wilcox
(74) *Attorney, Agent, or Firm* — Merchant & Gould P.C.

(57) ABSTRACT

A physically unclonable function (PUF) generator includes a first sense amplifier that has a first input terminal configured to receive a signal from a first memory cell of a plurality of memory cells, and a second input terminal configured to receive a signal from a second memory cell of the plurality of memory cells. The first sense amplifier is configured to compare accessing speeds of the first and second memory cells of the plurality of memory cells. Based on the comparison of the accessing speeds, the sense amplifier provides a first output signal for generating a PUF signature. A controller is configured to output an enable signal to the first sense amplifier, which has a first input terminal configured to receive a signal from a bit line of the first memory cell and a second input terminal configured to receive a signal from a bit line of the second memory cell.

20 Claims, 9 Drawing Sheets

(51) Int. Cl.
| | |
|---|---|
| *G11C 8/10* | (2006.01) |
| *G11C 11/4091* | (2006.01) |
| *G11C 11/16* | (2006.01) |
| *G11C 7/06* | (2006.01) |
| *G11C 13/00* | (2006.01) |
| *G11C 17/18* | (2006.01) |
| *G11C 11/419* | (2006.01) |
| *G11C 7/24* | (2006.01) |
| *G11C 11/4076* | (2006.01) |
| *G11C 11/413* | (2006.01) |
| *G11C 7/18* | (2006.01) |
| *G11C 29/44* | (2006.01) |

(52) U.S. Cl.
CPC ...... *G11C 11/1673* (2013.01); *G11C 11/1693* (2013.01); *G11C 11/1695* (2013.01); *G11C 11/4076* (2013.01); *G11C 11/4091* (2013.01); *G11C 11/413* (2013.01); *G11C 11/419* (2013.01); *G11C 13/0061* (2013.01); *G11C 17/18* (2013.01); *H04L 9/0866* (2013.01); *G11C 7/18* (2013.01); *G11C 2029/4402* (2013.01); *H04L 2209/12* (2013.01)

(58) Field of Classification Search
CPC ... G11C 8/10; G11C 11/1673; G11C 11/1693; G11C 11/1695; G11C 11/4076; G11C 11/4091; G11C 11/413; G11C 11/419; G11C 13/0061; G11C 17/18; G11C 7/18; G11C 2029/4402

See application file for complete search history.

(56) References Cited

U.S. PATENT DOCUMENTS

| | | | |
|---|---|---|---|
| 6,873,568 B2 | 3/2005 | Demone | |
| 7,483,327 B2 | 1/2009 | Qureshi et al. | |
| 8,817,123 B2* | 8/2014 | Shokrollahi | H04L 9/3278 348/222.1 |
| 10,164,640 B1* | 12/2018 | Lu | H03K 19/17768 |
| 10,432,198 B1* | 10/2019 | Wang | G06F 21/73 |
| 10,606,764 B1* | 3/2020 | Kravit | G06F 11/1629 |
| 2003/0037208 A1 | 2/2003 | Matthews et al. | |
| 2007/0297249 A1* | 12/2007 | Chang | G11C 11/413 365/189.11 |
| 2010/0293384 A1* | 11/2010 | Potkonjak | H04L 9/3278 713/176 |
| 2010/0293612 A1* | 11/2010 | Potkonjak | G06F 21/34 726/20 |
| 2012/0331287 A1* | 12/2012 | Bowman | H04W 12/35 713/156 |
| 2014/0205089 A1* | 7/2014 | Irwin | H04L 9/0819 380/44 |
| 2014/0268994 A1* | 9/2014 | Rose | G09C 1/00 365/148 |
| 2014/0334238 A1* | 11/2014 | Ware | G11C 7/1039 365/189.14 |
| 2015/0058928 A1* | 2/2015 | Guo | H04L 63/0876 726/3 |
| 2015/0304114 A1* | 10/2015 | Proust | H04L 9/3278 380/28 |
| 2016/0140357 A1* | 5/2016 | Newell | G06F 21/79 726/2 |
| 2016/0247555 A1* | 8/2016 | Nguyen | G11C 11/412 |
| 2017/0017808 A1* | 1/2017 | Kwong | G11C 29/50012 |
| 2017/0053708 A1 | 2/2017 | Wong et al. | |
| 2017/0092601 A1* | 3/2017 | Okagaki | H01L 23/576 |
| 2017/0178710 A1 | 6/2017 | Augustine et al. | |
| 2017/0310489 A1* | 10/2017 | Van Der Sluis et al. | H04L 9/30 |
| 2017/0329954 A1* | 11/2017 | Lao | G06F 21/44 |
| 2018/0069711 A1* | 3/2018 | Lu | G06F 12/1408 |
| 2018/0102163 A1* | 4/2018 | Lin | G11C 11/418 |
| 2018/0123808 A1* | 5/2018 | Hung | H04L 9/0866 |
| 2018/0129802 A1* | 5/2018 | Cambou | H04L 9/0643 |
| 2018/0131529 A1* | 5/2018 | Cambou | H04L 9/0662 |
| 2018/0176012 A1* | 6/2018 | Hung | H04L 9/3278 |
| 2018/0233461 A1* | 8/2018 | Okagaki | H01L 23/576 |
| 2019/0026724 A1* | 1/2019 | Wade | H04L 9/0866 |
| 2019/0028282 A1* | 1/2019 | Sharifi | G06F 21/86 |
| 2019/0028283 A1* | 1/2019 | Sharifi | G06F 21/86 |
| 2019/0028284 A1* | 1/2019 | Rezayee | H04L 9/3278 |
| 2019/0044739 A1* | 2/2019 | Sachdev | G09C 1/00 |
| 2019/0058603 A1* | 2/2019 | Lin | G11C 11/419 |
| 2019/0095610 A1* | 3/2019 | Cambou | H04L 9/0643 |
| 2019/0096478 A1* | 3/2019 | Lin | H04L 9/3278 |
| 2019/0140851 A1* | 5/2019 | Ma | G06F 21/72 |
| 2019/0163897 A1* | 5/2019 | Cambou | G06F 21/46 |
| 2019/0165938 A1* | 5/2019 | Lu | B25J 9/1692 |
| 2019/0334882 A1* | 10/2019 | Mondello | H04L 9/0866 |
| 2019/0379381 A1* | 12/2019 | Lu | G06F 21/73 |
| 2020/0014547 A1* | 1/2020 | Lu | G06F 21/73 |
| 2020/0051062 A1* | 2/2020 | Wade | H04L 9/3278 |
| 2020/0084052 A1* | 3/2020 | O'Connell | H04L 9/0866 |
| 2020/0099540 A1* | 3/2020 | Lu | G11C 7/24 |
| 2020/0136839 A1* | 4/2020 | Tsai | G11C 7/24 |
| 2020/0219085 A1* | 7/2020 | Sharifi | G06Q 20/3278 |
| 2020/0320209 A1* | 10/2020 | Cohen | G06F 21/566 |
| 2020/0402573 A1* | 12/2020 | Lin | G11C 11/418 |
| 2021/0083887 A1* | 3/2021 | Lu | H04L 9/3278 |
| 2021/0167957 A1* | 6/2021 | Hung | G06F 12/1408 |
| 2021/0203513 A1* | 7/2021 | Chang | H04L 9/3278 |

OTHER PUBLICATIONS

Tehranipoor—"Design and Architecture of Hardware-based Random Function Security Primitives," University of Connecticut, Doctoral Dissertations, pp. 1-201, Aug. 1, 2017 (Year: 2017).*

* cited by examiner

PHYSICALLY UNCLONABLE FUNCTION (PUF) GENERATION

CROSS-REFERENCE

This Application claims the benefit of U.S. Provisional Patent Application No. 62/546,726, filed on Aug. 17, 2017, the entire disclosure of which is incorporated by reference in its entirety.

BACKGROUND

With the increasing use of electronic devices utilizing integrated circuits to provide different types of information for a variety of different applications, there has been an increasing need to adequately protect sensitive and/or critical information that may be stored within an electronic device to limit access to such information to only such other devices that have permission to access the information. Some examples of applications include the authentication of devices, protection of confidential information within a device, and securing a communication between two or more devices.

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF. With the establishment of the identity, secure communication can be provided between devices. The PUF can also be used for existing authentication purposes to replace the current method of assigning an identity to an electronic device. Since the PUF is based on intrinsic properties of a manufacturing process, the PUF has various advantages over conventional authentication approaches that inscribe an identity on a device that may be mimicked and/or reverse engineered more easily.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
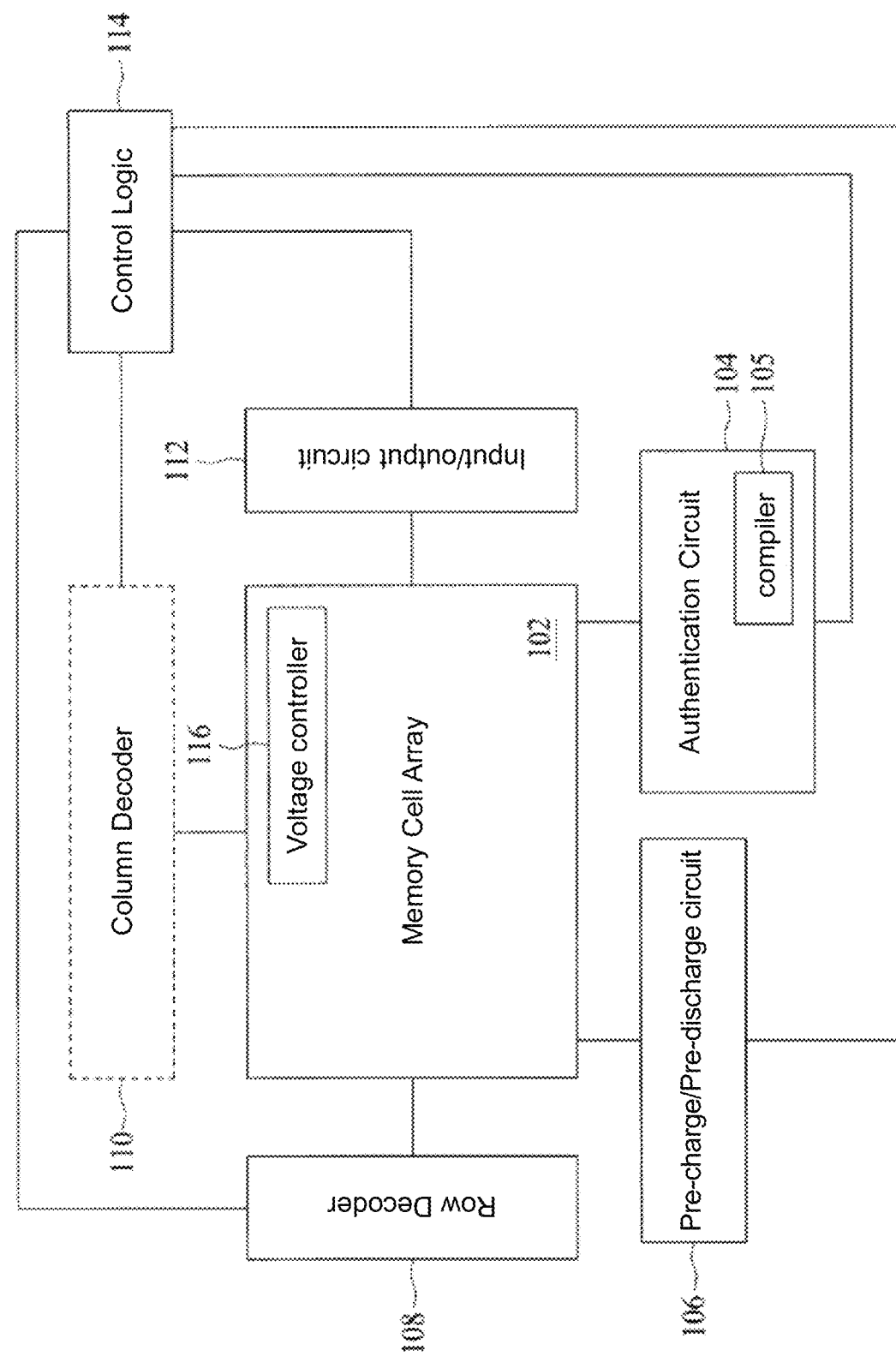
FIG. 1 is a block diagram illustrating an example of a memory device that includes an authentication circuit, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physical unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a plurality of ICs, each IC may be slightly different due to manufacturing variability. PUFs leverage this variability to derive "secret" information that is unique to each of the ICs (e.g., a silicon "biometric"). Generally, such secret information is referred to as a "signature" of the IC. In addition, due to the manufacturing variability that defines the signature, one cannot manufacture two identical ICs even with full knowledge of the IC's design. Various types of variability of an IC can be used to define such a signature such as, for example, gate delay(s), power-on state(s) of a static random-access memory (SRAM) device, and/or any of a variety of physical characteristics of an IC.

In the example of using the power-on state(s) of a static random-access memory (SRAM) device provided above, even though an SRAM device includes symmetric cells (bits), manufacturing variability may still cause each bit of the SRAM device to tend to be at a high state (i.e., a logical "1") or at a low state (i.e., a logical "0") while the SRAM device is powered on. Such initial power-on states of the bits are randomly distributed across the whole SRAM device, which gives rises to a variability that can be defined by a PUF to produce a unique signature of the SRAM device. Generally, generating a PUF signature by using the power-on state(s) of an SRAM device is referred to as a "power-on SRAM-based PUF." To generate a PUF signature using a power-on SRAM-based PUF generally uses at least one iteration of powering up and down the SRAM device, which may disadvantageously result in additional power consumption while operating the SRAM device and it may require longer time to generate the signature (e.g., a limited throughput). Still further, the power-on state of each bit of an SRAM device is typically subjected to a variety of local environment parameters such as, for example, an operation temperature of the bit, a supply voltage of the bit, a stress tolerated by the bit, an aging effect of the bit, etc. Accordingly, the power-on states of two bits located at two different locations may significantly depend on the respective local environment parameters to which the two bits are subjected. As such, the PUF signature, generated based on the power-on states of these two bits, may be less reliable. Other types of conventional PUF using the physical characteristics of an IC to generate a PUF signature may have similar issues as described above. Therefore, the conventional PUF has not been entirely satisfactory at every aspect.

Embodiments of the present disclosure provide various systems and methods to generate, at least, a bit of a PUF signature for a memory device by comparing accessing speeds (e.g., reading speeds) of two memory cells of the memory device. Since the disclosed systems and methods generate the PUF signature based on the comparison of reading speeds, no iteration to power up and down the memory device is required, which eliminates the power consumption issue the conventional power-on SRAM-based PUF is facing. Further, by comparing the reading speeds of two adjacent memory cells of the memory device (to generate the PUF signature), the PUF signature may be less subjected to the environment parameters as described above, and thus may be more reliable. Moreover, in certain disclosed embodiments, comparing the accessing speeds of the two memory cells is initiated based on signals received from the memory cells themselves, rather than on an empirically derived signal such as a global clock signal, thus providing a more stable read margin for comparing the accessing speeds.

FIG. 1 illustrates a memory device 100 in accordance with various embodiments. In the illustrated embodiment of FIG. 1, the memory device 100 includes a memory cell array 102, an authentication circuit 104, a pre-charge/pre-discharge (PC/PD) circuit 106, a row decoder 108, an optional column decoder 110, an input/output (I/O) circuit 112, and a control logic 114. Further, as illustrated in FIG. 1, the memory cell array 102 includes an embedded voltage controller 116. In some embodiments, despite not being shown in FIG. 1, all of the components (i.e., 102, 104, 106, 108, 110, and 112) may be coupled to each other and to the control logic 114 such that they are controlled by the control logic 114. Although, in the illustrated embodiment of FIG. 1, each component is shown as a separate block for the purpose of clear illustration, in some other embodiments, some or all of the components shown in FIG. 1 may be integrated together. For example, the memory cell array 102 may include an embedded authentication circuit (e.g., 104).

Referring still to FIG. 1, in some embodiments, the memory cell array 102 includes a plurality of memory cells that are arranged in a column-row configuration in which each column has a bit line (BL) and a bit bar line (BBL) and each row has a word line (WL). More specifically, the BL and BBL of each column are respectively coupled to a plurality of memory cells that are disposed in that column, and each memory cell in that column is arranged on a different row and coupled to a respective (different) WL. That is, each memory cell of the memory cell array 102 is coupled to a BL of a column of the memory cell array 102, a BBL of the column of the memory cell array 102, and a WL of a row of the memory cell array 102. In some embodiments, the BLs and BBLs are arranged in parallel vertically and the WLs are arranged in parallel horizontally (i.e., perpendicular to the BLs and BBLs). In some embodiments, the authentication circuit 104 includes a plurality of sense amplifiers that are coupled to the plurality of memory cells. Each sense amplifier of the authentication circuit 104 is configured to compare reading speeds (i.e., either charging rate or discharging rate, which will be discussed further below) between two or more memory cells coupled to that sense amplifier, through each memory cell's coupled BL or BBL, so as to provide an output bit based on the comparison result.

In some embodiments, the authentication circuit 104 may further include a compiler 105 to receive the output bit of each sense amplifier and use the output bit(s) to generate a PUF signature. The PC/PD circuit 106 is also coupled to the plurality of memory cells and configured to pre-charge and/or pre-discharge the BLs and/or BBLs. The row decoder 108 is configured to receive a row address of the memory cell array and assert a WL at that row address. In some embodiments, the column decoder 110 may be optional. The column decoder 110 is configured to receive a column address of the memory cell array and assert a BL and/or BBL at that column address. The I/O circuit 112 is configured to access a data bit (i.e., a logical "1" or a logical "0") at each of the memory cells. In some embodiments, a data bit may be written to or read from a memory cell by the I/O circuit 112. As described above, in some embodiments, the control logic 114 is coupled to all the components and configured to control the coupled components. The voltage controller 116 is configured to control (e.g., increase or decrease) a voltage level of a supply voltage applied at each of the memory cells. In some alternative embodiments, the voltage controller 116 may be implemented as a separate block, which is not embedded in the memory cell array 102 as shown in FIG. 1. An illustrated embodiment of the memory cell array 102, the authentication circuit 104, and the I/O circuit 112 will be provided in further detail below with reference to FIG. 2.

Figure 2:
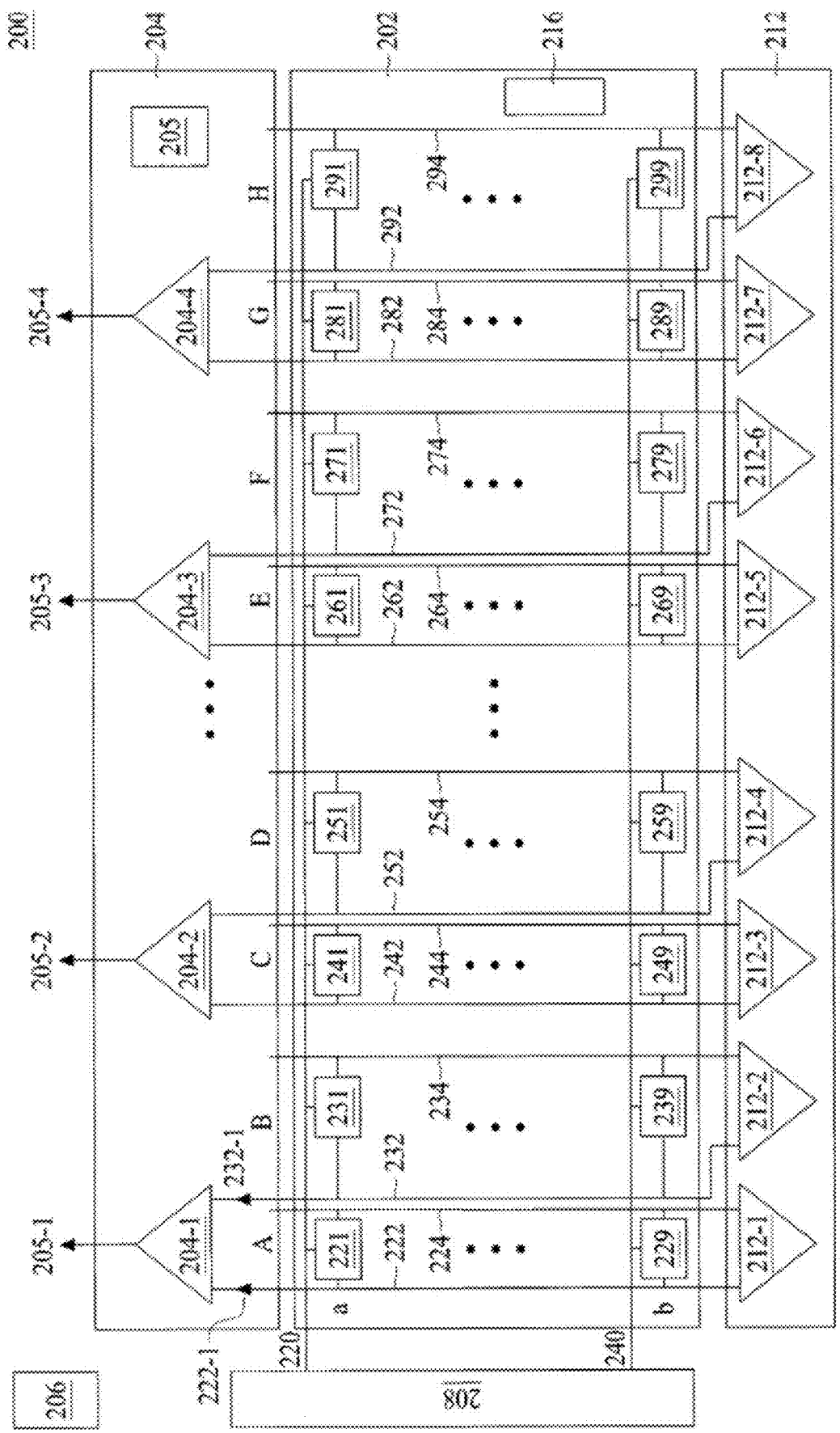
FIG. 2 is a block diagram illustrating the example memory device in FIG. 1 including a schematic diagram of an authentication circuit, in accordance with some embodiments.

Referring now to FIG. 2, an embodiment of a memory device 200 is illustrated. The memory device 200 may be substantially similar to the memory device 100 and thus the memory cell array 202, the authentication circuit 204, the PC/PD circuit 206, the row decoder 208, the I/O circuit 212, the control logic 214 and voltage controller 216 may be substantially similar to the corresponding components 102, 104, 106, 108, 112, 114 and 116 of FIG. 1, respectively. Accordingly, the functionality of each component in FIG. 2 may be substantially similar to the corresponding component of FIG. 1. In some embodiments, the memory cell array 202 may be an SRAM array. However, the memory cell array 202 may be implemented as any of a variety of memory cell arrays (e.g., DRAM, MRAM, RRAM etc.) while remaining within the scope of the present disclosure. For example, the memory cell array 102/202 may be implemented as a read-only-memory (ROM) array, a logic n-type metal-oxide-semiconductor (NMOS) array, a logic p-type metal-oxide-semiconductor (PMOS) array, or a combination thereof, which will be illustrated and discussed in some further embodiments with respect to FIGS. 11, 12, and 13.

Referring still to FIG. 2, as described above, the SRAM memory cell array 202 includes a plurality of SRAM memory cells (e.g., 221, 229, 231, 239, 241, 249, 251, 259, 261, 269, 271, 279, 281, 289, 291, 299) arranged in a column-row configuration. For clarity, the SRAM memory cell is referred as "cell" hereinafter. Although the illustrated embodiment of FIG. 2 shows only 16 cells, any desired number of cells may be included in the embodiment of memory device 200 while remaining within the scope of the present disclosure. More specifically in the memory cell array 202 of FIG. 2, cells 221 and 229, and any other cells disposed therebetween are arranged in column "A". Similarly, cells 231 and 239, and any other cells disposed therebetween are arranged in column "B;" cells 241 and 249, and any other cells disposed therebetween are arranged in column "C;" cells 251 and cell 259, and any other cells disposed therebetween are arranged in column "D;" cells 261 and 269, and any other cells disposed therebetween are arranged in column "E;" cells 271 and 279, and any other cells disposed therebetween are arranged in column "F;" cells 281 and 289, and any other cells disposed therebetween are arranged in column "G;" cells 291 and 299, and any other cells disposed therebetween are arranged in column "H." Although only 8 columns are illustrated, any desired number of columns may be arranged between the columns D and E. In each column, any desired number of cells may be disposed between the illustrated cells. For example, in column A, one or more cells may be disposed between the cells 221 and 229. Still more specifically in FIG. 2, the cells in each column are each disposed in a respective row, and each row may include a plurality of cells that each belong to a respective, and different column. In the illustrated embodiment of FIG. 2, the cells 221, 231, 241, 251, 261, 271, 281, and 291 that belong to column A, B, C, D, E, F, G, and H, respectively, are disposed in a same row, hereinafter row "a." Similarly, the cells 229, 239, 249, 259, 269, 279, 289, and 299 that belong to column A, B, C, D, E, F, G, and H, respectively, are disposed in a same row, hereinafter row "b." Although only 2 rows are illustrated, any desired number of rows may be arranged between the rows a and b.

As described above, each column has a respective pair of BL and BBL that are coupled to the cells in that column, and each row has a respective WL that is coupled to multiple cells that respectively belong to multiple columns. For example, as illustrated in the SRAM cell array 202 of FIG. 2, column A has BL 222 and BBL 224; column B has BL 232 and BBL 234; column C has BL 242 and BBL 244; column D has BL 252 and BBL 254; column E has BL 262 and BBL 264; column F has BL 272 and BBL 274; column G has BL 282 and BBL 284; column H has BL 292 and BBL 294. The cells of each column are coupled to the column's BL and BBL. For example, in FIG. 2, the cells 221 and 229, and any cells coupled therebetween are each coupled to the BL 222 and BBL 224; the cells 231 and 239, and any cells coupled therebetween are each coupled to the BL 232 and BBL 234; the cells 241 and 249, and any cells coupled therebetween are each coupled to the BL 242 and BBL 244; the cells 251 and 259, and any cells coupled therebetween are each coupled to the BL 252 and BBL 254; the cells 261 and 269, and any cells coupled therebetween are each coupled to the BL 262 and BBL 264; the cells 281 and 289, and any cells coupled therebetween are each coupled to the BL 282 and BBL 284; the cells 291 and 299, and any cells coupled therebetween are each coupled to the BL 292 and BBL 294. Further in FIG. 2, the cells 221, 231, 241, 251, 261, 271, 281, and up to 291 arranged in the row a are each coupled to the WL 220 of row a; and the cells 229, 239, 249, 259, 269, 279, 289, and up to 299 arranged in the row b are each coupled to the WL 240 of row b.

Referring still to FIG. 2, the authentication circuit 204 includes sense amplifiers 204-1, 204-2, 204-3, and up to 204-4 wherein each sense amplifier of the authentication circuit 204 is coupled to two BLs that respectively belong to two adjacent columns. For example, as shown in the illustrated embodiment of FIG. 2, the sense amplifier 204-1 is coupled to the BLs 222 and 232; the sense amplifier 204-2 is coupled to the BLs 242 and 252; the sense amplifier 204-3 is coupled to the BLs 262 and 272; and the sense amplifier 204-4 is coupled to the BLs 282 and 292. Although, as shown in FIG. 2, each of the sense amplifiers of the authentication circuit 204 is coupled to two BLs that respectively belong to two adjacent columns, in some other embodiments, each of the sense amplifiers of the authentication circuit 204 may be coupled to two BBLs that respectively belong to two adjacent columns (e.g., the sense amplifier 204-1 is coupled to the BBLs 224 and 234). In some embodiments, each of the sense amplifiers of the authentication circuit 204 is configured to receive first and second input signals through the coupled BLs that belong to two adjacent columns, respectively, and compare the first and second input signals so as to provide an output signal. More specifically, the first and second input signals are provided by two cells that are on a same row and respectively belong to the two adjacent columns while these two cells are being accessed (e.g., read). For example, a pair of first and second input signals for the sense amplifier 204-1 may be generated while the cells 221 and 231 are being accessed; another pair of first and second input signals for the sense amplifier 204-1 may be generated while the cells 229 and 239 are being accessed. In some embodiments, such first and second input signals may each include either a discharging rate or a charging rate (i.e., a reading speed) of a coupled cell. Accordingly, an output signal is generated based on a comparison of the reading speeds, and such an output signal may be used by the compiler 205 of the authentication circuit 204 to generate, at least part of, a PUF signature. In an example, the sense amplifier 204-1 is configured to receive the first reading speed (the signal 222-1) from the cell 221 along the BL 222 and the second reading speed (the signal 232-1) from the cell 231 along the BL 232, respectively, and compare the signals 222-1 and 232-1 so as to provide an output signal 205-1.

Referring still to FIG. 2, the PC/PD circuit 206 is coupled to all the BLs and BBLs of the SRAM cell array 202. In some embodiments, the PC/PD circuit 206 is configured to pre-charge and/or pre-discharge the BL and/or BBL coupled to a cell of the SRAM cell array 202 before a data bit (i.e., a logical 1 or 0) stored in the cell is read through the coupled BL and/or the BBL. As a representative example, before a bit data stored in the cell 221 is read, the PC/PD circuit 206 is configured to pre-charge the BL 222 and BBL 224 coupled to the cell 221. The row decoder 208 is coupled to all the WLs of the SRAM cell array 202. In some embodiments, the row decoder 208 is configured to receive a row address (as described above) and, based on the row address, to assert the WL at the row address so as to activate one or more access transistors coupled to the WL. The I/O circuit 212 includes another plurality of sense amplifiers 212-1, 212-2, 212-3, 212-4, 212-5, 212-6, and up to 212-8. Different from the sense amplifier of the authentication circuit 204, each of the sense amplifiers of the I/O circuit 212 is coupled to the BL and BBL of one single column. For example, the sense amplifier 212-1 is coupled to the BL 222 and BBL 224 of column A; the sense amplifier 212-2 is coupled to the BL 232 and BBL 234 of column B; the sense amplifier 212-3 is coupled to the BL 242 and BBL 244 of column C; the sense amplifier 212-4 is coupled to the BL 252 and BBL 254 of column D; the sense amplifier 212-5 is coupled to the BL 262 and BBL 264 of column E; the sense amplifier 212-6 is coupled to the BL 272 and BBL 274 of column F; the sense amplifier 212-7 is coupled to the BL 282 and BBL 284 of column G; and the sense amplifier 212-8 is coupled to the BL 292 and BBL 294 of column H. Operatively, such sense amplifiers of the I/O circuit 212 are each configured to compare a voltage difference between the coupled BL and BBL to which a cell is coupled so as to read bit data stored in that cell. As a representative example, if the bit data stored in the cell 221 is a logical 1, the sense amplifier 212-1 may read a logical 1 based on the comparison of the voltage difference between the coupled BL 222 and BBL 224. Details of the operations of the memory device 200 and the associated components/signals will be discussed further below with reference to FIG. 3.

Figure 3:
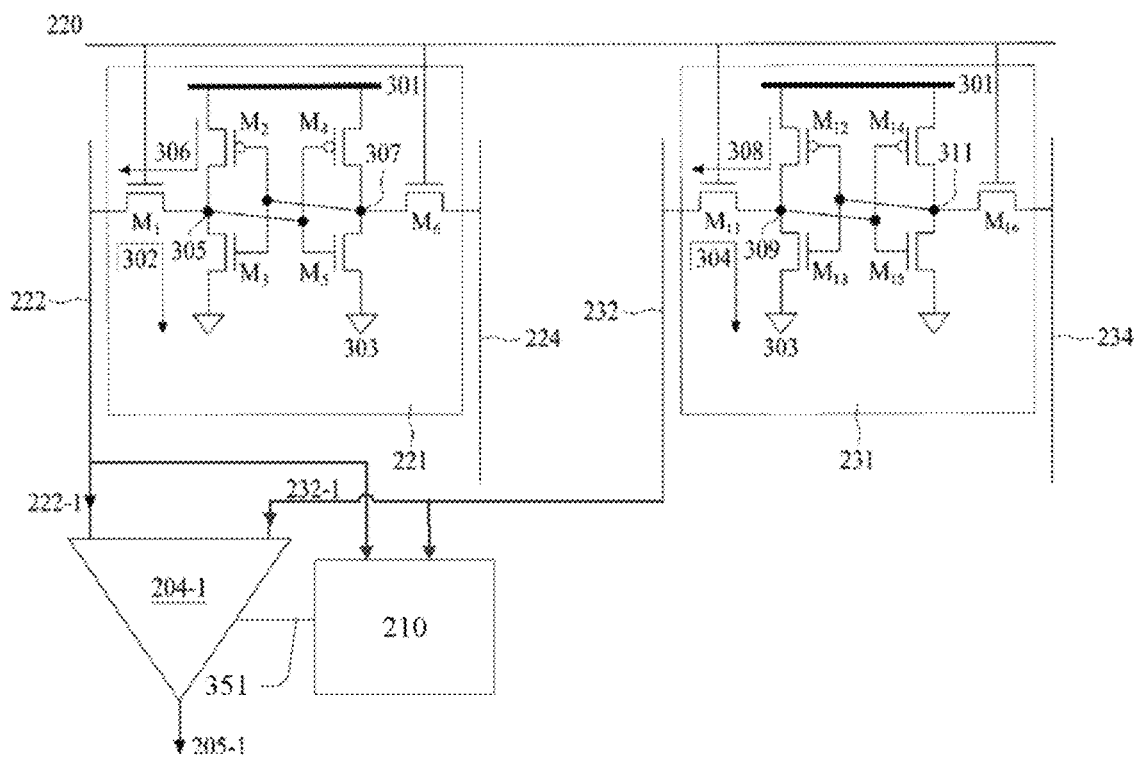
FIG. 3 is a circuit diagram illustrating an example of two memory cells of the SRAM cell array and a sense amplifier and controller of the authentication circuit of FIG. 2, in accordance with some embodiments.

FIG. 3 illustrates an exemplary SRAM circuit showing details of two adjacent cells 221 and 231, and their coupled sense amplifier 204-1 of the authentication circuit 204, in accordance with various embodiments. The illustrated embodiment of FIG. 3 will be discussed in conjunction with FIG. 2. As shown in FIG. 3, although the cells 221 and 231 are each implemented as a 6-transistor SRAM (6T-SRAM) cell, the cell (e.g., 221, 231, etc.) of the SRAM cell array 202 is not limited to being implemented as a 6T-SRAM cell. The cell of the SRAM cell array 202 may be implemented as any of a variety of SRAM cells such as, for example, 2T-2R SRAM cell, 4T-SRAM cell, 8T-SRAM cell, etc.

Referring still to FIG. 3, cell 221 includes transistors: M1, M2, M3, M4, M5, and M6; and cell 231 includes transistors: M11, M12, M13, M14, M15, and M16. In some embodiments, the cells 221 and 231 are substantially similar to each other, that is, transistor M1 is substantially similar to transistor M11; transistor M2 is substantially similar to transistor M12; transistor M3 is substantially similar to transistor M13; transistor M4 is substantially similar to transistor M14; transistor M5 is substantially similar to transistor M15; and transistor M6 is substantially similar to transistor M16. Thus, for clarity, the following discussions of configurations and operations of the transistors of the cell will be directed to the cell 221 only.

As illustrated in FIG. 3, the transistor M2 and M3 are formed as a first inverter and the transistors M4 and M5 are formed as a second inverter wherein the first and second inverters are coupled to each other. More specifically, the first and second inverters are each coupled between first voltage reference 301 and second voltage reference 303. Generally, the first voltage reference 301 is a voltage level of a supply voltage applied on the cell 221. The first voltage reference 301 is typically referred to as "Vdd." The second voltage reference 303 is typically referred to as "ground." In some embodiments, the voltage level of Vdd is determined by the control logic 214 and controlled by the voltage controller 216. For example, the voltage level may range from about 30% of Vdd to about 130% of Vdd. Further, the first inverter is coupled to the transistor M1, and the second inverter is coupled to the transistor M6. In addition to being coupled to the inverters, the transistors M1 and M6 are both coupled to the WL 220 and each coupled to the BL 222 and BBL 224, respectively. The transistors M1 and M6 are typically referred to as access transistors of the cell 221. In some embodiments, the transistors M1, M3, M5, and M6 each includes an NMOS transistor, and M2 and M4 each includes a PMOS transistor. Although the illustrated embodiments of FIG. 3 shows that M1-M6, and M11-M16 are either NMOS or PMOS transistors, any of a variety of transistors or devices that are suitable for use in a memory device may be implemented as at least one of M1-M6, and M11-M16 such as, for example, BJT, HEMT, etc.

In general, when an SRAM cell stores a data bit, a first node of the SRAM cell is configured to be at a first logical state (1 or 0), and a second node of the SRAM cell is configured to be at a second logical state (0 or 1), wherein the first and second logical states are complementary with each other. In some embodiments, the first logical state at the first node is the data bit stored by the SRAM cell. For example, the illustrated embodiment of FIG. 3 includes nodes 305 and 307. When the cell 221 stores a data bit (e.g., a logical 1), the node 305 is configured to be at the logical 1 state, and the node 307 is configured to be at the logical 0 state.

To cause the authentication circuit 204 to generate a PUF signature, in some embodiments, initially, a data bit (e.g., either a logical 1 or 0) is written to each of the cells in the SRAM cell array 202 to be read. In some embodiments, such an operation (write) may be performed by the I/O circuit 212. More specifically, the I/O circuit 212 may include further components (e.g., one or more sense amplifiers) to perform the write operation(s). Subsequently, the row decoder 208 receives a row address to locate (determine) a WL at that row address and then the WL is asserted by the row decoder 208. In some embodiments, such a row address may be provided by the control logic 214. In response to the WL being asserted (e.g., 220), the access transistors (e.g., M1, M6, M11, M16), disposed along and coupled to the WL, are activated (i.e., turned on). According to some embodiments of the present disclosure, all or part of the BLs and BBLs (e.g., 222, 224, 232, and 234) of the cell array 202 are either pre-charged to Vdd or pre-discharged to ground by the PC/PD circuit 206. Then the data bit stored (being written) in each cell (e.g., 221 . . . etc.) of the row (i.e., along the asserted WL) is read through the cell's respectively coupled BL (e.g., 222) and BBL (e.g., 224) by a corresponding sense amplifier (e.g., 212-1) of the I/O circuit 212. While the data bits are being read, in some embodiments, each of the sense amplifiers (e.g., 204-1) of the authentication circuit 204 coupled to the BLs (or BBLs) of two columns/cells (e.g., 221 and 231) at that row compares reading speeds (i.e., either the charging rates or the discharging rates) of the two adjacent cells along the coupled BLs (or BBLs) in response to a sense amplifier enable signal 351 output by a controller 210. In some embodiments, the controller 210 is implemented by the control logic 205.

Thus, the sense amplifier of the authentication circuit 204 starts to compare reading speeds (either discharging rate or charging rate) of the two adjacent cells at the same row. In response to the comparison, each of the sense amplifiers of the authentication circuit 204 may generate a bit (e.g., 205-1) for a PUF signature. As such, for a particular row (WL) being asserted, a first plurality of bits (e.g., 205-1, 205-2, 205-3 . . . 205-4) of the PUF signature may be (simultaneously) generated by the sense amplifiers of the authentication circuit 204. In some embodiments, each of the other rows (WLs) in the memory cell array is subsequently asserted. Accordingly, one or more pluralities of bits of the PUF signature may be generated by the sense amplifiers of the authentication circuit 204. As such, when a memory cell array includes $N^2$ cells (N columns×N rows) and each sense amplifier of the authentication circuit is coupled to two adjacent BLs (i.e., two adjacent columns) of the memory cell array, as illustrated in FIG. 2, a generated PUF signature may include ½ $N^2$ bits while logical states (either 1 or 0) of the data bits are being read.

As described above, the sense amplifier 201-4 is configured to receive input signals 222-1 and 232-1 from the cell 221 along the BL 222 and from the cell 231 along the BL 232, respectively, to generate the output signal 205-1. In some embodiments, the input signal 222-1 may be a voltage level present on the BL 222 at a particular time; the input signal 232-1 may be a voltage level present on the BL 232 at that particular time.

Additionally, in some embodiments, the sense amplifiers 204-1, 204-2, 204-3, 204-4 are configured to receive an enablement signal 351 from the controller 210. If the reading speeds of the adjacent memory cells of the memory device used to generate the PUF signature are very similar, it could be difficult to consistently generate the outputs for the PUF signature as desired. Accordingly, in certain disclosed embodiments, the controller 210 is configured to output the enable signal 351 based on signals received from the first and second memory cells, such as signals 222-1 and 232-1 from the BLs 222 and 232 of the cells 221 and 231, as opposed to, for example, a generic clock signal. Moreover, in some examples, each of the sense amplifiers of the authentication circuit 204 is controlled locally—by a corresponding controller 210 in response to the input signals present on the respective bit lines rather than globally, providing a more stable read margin for the BLs.

Figure 4A:
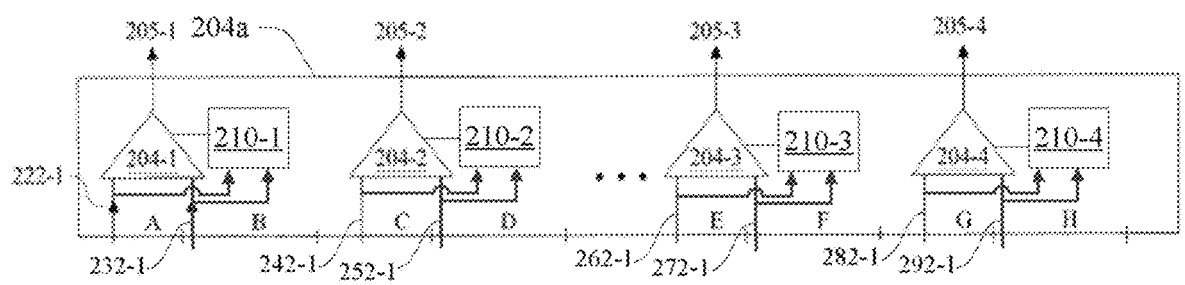
FIG. 4A is a circuit diagram illustrating sense amplifiers and associated controllers of an example of the authentication circuit of FIG. 2, in accordance with some embodiments.

FIG. 4A illustrates such an authentication circuit 204a, wherein each of the sense amplifiers 204-1, 204-2, 204-3, 204-4 receives an enable signal from a respective controller 210-1, 210-2, 210-3, 210-4. Further, each of the controllers 210-1, 210-2, 210-3, 210-4 outputs an enable signal in response to the BL signals received by the corresponding sense amplifier. Thus, the controller 210-1 receives one input signal from a BL 222-1 of memory cell 221, and another input from BL 231-1 of memory cell 231. Likewise, the other illustrated controllers 210-2, 210-3, 210-4 shown in FIG. 4A receive input signals from the same BLs providing input signals to the respective sense amplifiers 204-2, 204, 204-4.

Figure 4B:
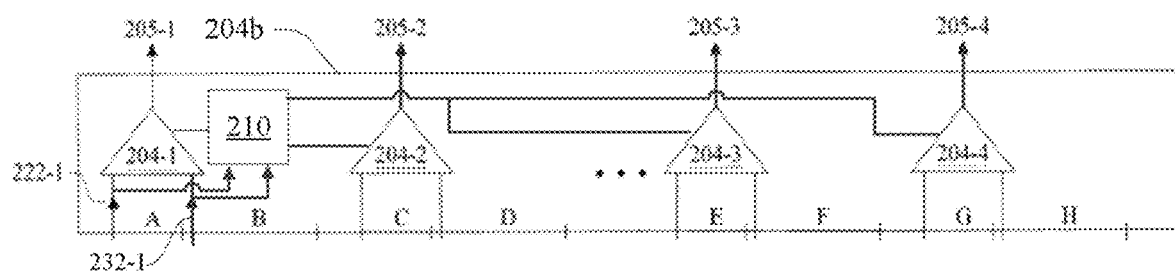
FIG. 4B is a circuit diagram illustrating sense amplifiers and a controller of another example of the authentication circuit of FIG. 2.

Alternatively, FIG. 4B illustrates an embodiment in which, like the example of FIG. 4A, the single controller 210 receives one input signal from a BL 222-1 of memory cell 221, and another input signal from BL 231-1 of memory cell 231. However, the controller 210 outputs an enable signal to each of the sense amplifiers 210-1, 210-2, 210-3, 210-4, based on the signals received from BL 222-1 of memory cell 221 and BL 231-1 of memory cell 231, rather than a global signal empirically generated or a global clock signal.

Thus, each of the sense amplifiers 204-1, 204-2, 204-3, 204-4 of the authentication circuits 204a and 204b is controlled based on an enable signal that is generated in response to signals on local BLs. In this manner, BL speed fluctuations due to process variation, for example, are better compensated for, and the read margin for each IO signal is stabilized.

Upon the enablement signal 351 being triggered (e.g. the enable signal 351 goes from low to high), the sense amplifier 204-1 is configured to start comparing the input signals 222-1 and 232-1 (i.e., comparing the voltage levels on the BLs 222 and 232) over time which will be discussed in further detail below. In some embodiments, in response to a voltage level difference between the BLs 222 and 232 exceeding a predefined threshold (e.g., 50 mV) at a particular time (i.e., a discharging rate or a charging rate being determined), the sense amplifier 204-1 is configured to generate the output signal 205-1 as a logical 1, and in response to the voltage level difference between the BLs 222 and 232 not exceeding the predefined threshold, the sense amplifier 204-1 is configured to generate the output signal 205-1 as a logical 0. Details of how the discharging and charging rates are determined will be discussed further below. In some embodiments, the sense amplifier 204-1 may continue comparing the voltage levels on the BLs 222 and 232 over time until the BLs 222 and 232 are fully discharged to ground or fully charged to Vdd, or until the voltage level difference between the BLs 222 and 232 exceeds the predefined threshold.

Referring still to FIG. 3 and in conjunction with FIG. 2, in some embodiments, the control logic 214 may decide whether to write either a logical 1 or a logical 0 (through the I/O circuit 212) to all of the plurality of cells (e.g., 221, 231, 234, 251, 261, 271, 281, 291, 229, 239, 249, 259, 269, 279, 289, 299, etc.) of the SRAM cell array 202. Such a written logical 1 or 0 may be stored in each of the cell as a data bit. As described above, the data bit may be stored in the first node of each cell (e.g., 302 of cell 221, 306 of cell 231), and a complementary data bit (opposite to the logical state of the data bit) may be stored in the second node of the cell (e.g., 304 of cell 221, 308 of cell 231).

In some embodiments, if the data bit stored (being written) in each of the plurality of cells is a logical 0, the nodes 302 and 306 of the cells 221 and 231 are respectively at a logical 0 state, the nodes 304 and 308 of the cells 221 and 231 are respectively at a logical 1 state, and the control logic may be configured to cause the PC/PD circuit 106 to "pre-charge" all or a subset of the BLs and BBLs (222, 224, 232, and 234) to Vdd. Prior to, simultaneously with, or subsequent to the pre-charging, the control logic 214 may cause the row decoder 208 to assert a WL of a row (e.g., the WL 220 in the example of FIG. 3) so as to activate (turn on) all the access transistors (e.g., M1, M6, M11, and M16). In some embodiments, the voltage level of the voltage reference 301 may be lower than Vdd such as, for example, between about 50% of Vdd and about 99% of Vdd. In response to the access transistors M1 and M11 being turned on, since the BLs 222 and 232 are pre-charged to Vdd and the nodes 302 and 306 are at the logical 0 state (e.g., ground), a discharging path 302 may be formed from the BL 222, through the access transistor M1 and the transistor M3 in the cell 221, and to ground, and a discharging path 304 may be formed from the BL 232, through the access transistor M11 and the transistor M13 in the cell 231 and to ground, respectively. Due to a variety of manufacturing variations, each transistor in the memory cell array may not be exactly the same. In other words, each transistor has a plurality of distinct characteristics such as, for example, a distinct threshold voltage, a distinct mobility, a distinct on/off ratio, a distinct sub-threshold slope, etc. As such, in some embodiments, the discharging paths 302 of the cell 221 and 304 of the cell 231 may each have a discharging rate, and these two discharging rates may be different from each other. For example, the discharging rate of the discharging path 302 of the cell 221 can be faster/slower than the discharging rate of the discharging path 304 of the cell 231. Using such a difference of the discharging rates between two adjacent cells, a bit (e.g., 205-1) of a PUF signature may be generated by the sense amplifier 204-1. For example, the sense amplifier 204-1 compares the discharging rates of the cells 221 and 231. Based on the comparison, if the difference of these two discharging rates is higher than a predefined threshold (e.g., 50 mV/sec), the sense amplifier 204-1 may provide the output signal 205-1 as a logical 1; if the difference of the two discharging rates is lower than the predefined threshold, the sense amplifier 204-1 may provide the output signal 205-1 as a logical 0. Details of the discharging rate will be discussed further below.

Referring again to FIG. 2, in some embodiments, one or more output signals (bits) may be respectively provided by other sense amplifiers (e.g., 204-2, 204-3, 204-4, etc.) at the same row as the sense amplifier 204-1 of the authentication circuit 204, based on comparing discharging rates of each respective sense amplifier's coupled "discharging paths." For example, the sense amplifier 204-2 compares the discharging rates of the discharging paths formed through the transistor of the cells 241 and 251, respectively, and outputs the output bit 205-2 based on the comparison; the sense amplifier 204-4 compares the discharging rates of the discharging paths formed through the transistor of the cells 261 and 271, respectively, and outputs the output bit 205-3 based on the comparison; the sense amplifier 204-4 compares the discharging rates of the discharging paths formed through the transistor of the cells 281 and 291, respectively, and outputs the output bit 205-4 based on the comparison. In some embodiments, the output bits 205-1, 205-2, 205-3, and 205-4 may constitute a PUF signature (e.g., 0100). In other embodiments, the output bits 205-1, 205-2, 205-3, and 205-4 may be further processed (e.g., selected or filtered) by compiler 205 to generate a PUF signature. Yet in some other embodiments, the output bits 205-1, 205-2, 205-3, and 205-4 generated based on the comparisons of discharging rates of two adjacent cells at a first row (e.g., row a) may be further processed, together with the output bits 205-1, 205-2, 205-3, and 205-4 generated based on the comparisons of discharging rates of two adjacent cells at a second row (e.g., row b), by the compiler 205 to generate a PUF signature.

Figure 5:
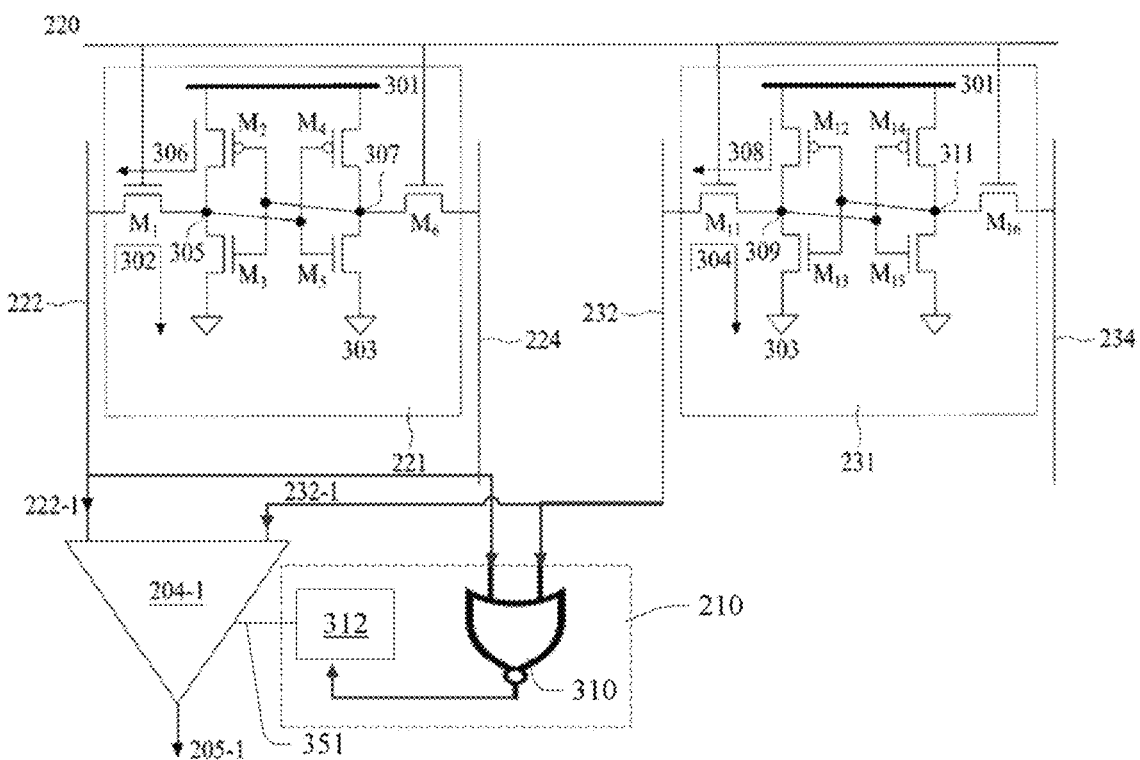
FIG. 5 is a circuit diagram illustrating an example of two memory cells of the SRAM cell array and sense amplifier of the authentication circuit of FIG. 2, and an example of the controller in accordance with some embodiments.
Figure 6:
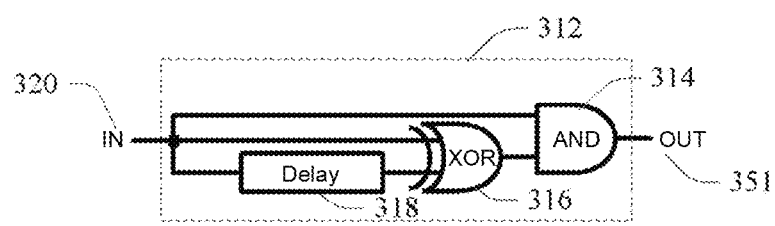
FIG. 6 is a circuit diagram illustrating an example of the pulse generator of the controller shown in FIG. 5, in accordance with some embodiments.
Figure 7:
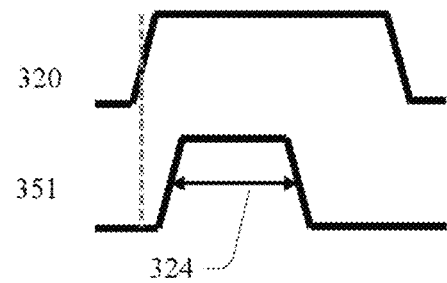
FIG. 7 illustrates examples of waveforms generated by an example of the pulse generator shown in FIG. 6, in accordance with some embodiments.

FIG. 5 illustrates the memory cells 221 and 231 and their coupled sense amplifier 204-1, along with an example of the controller 210, which is configured to generate the sense amplifier enable signal 351 that is received by the sense amplifier 204-1. The controller 210 shown in FIG. 5 includes a NOR gate 310 having first and second input terminals coupled to the BLs 222-1 and 232-1. Thus, the NOR gate 310 receives the same input signals as the sense amplifier 204-1. The output of the NOR gate 310 is received by a pulse generator 312, which provides a pulsed enable signal 351 to the sense amplifier 204-1. An example of the pulse generator 312 is shown in FIG. 6, where the pulse generator includes an AND gate 314 that receives an input signal 320 from the NOR gate 310, and provides the sense amplifier enable signal 351 as an output. An XOR gate 316 receives the input signal 320 directly at one input, as well as the input 320 via a delay element 318 at a second input. Thus, as shown in FIG. 7, when the input signal 320 received from the NOR gate 310 goes to a logic high, the AND gate 314 receives the high input signal 320 at one input, as well as a high output from the XOR gate 316. This defines the leading edge of the pulsed enable signal 351, resulting in the enable signal 351 going to a logic high. The trailing edge of the enable signal 351 pulse is determined when a delay period 324 has expired. When the delay element 318 output goes to a logic high, the XOR gate 316 output goes low, in turn resulting in the enable signal 351 at the output of the AND gate 314 also going low.

Figure 8:
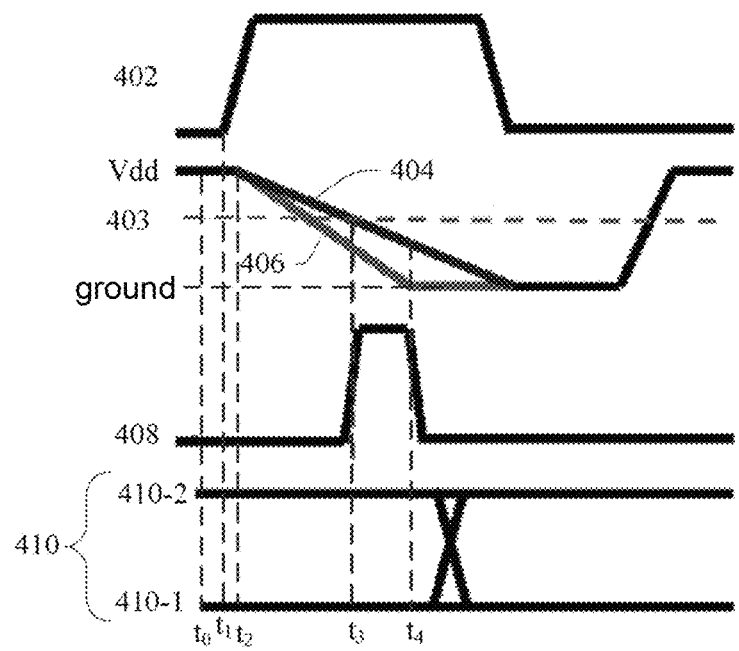
FIG. 8 illustrates examples of waveforms of signals of the circuit of FIG. 5, in accordance with some embodiments.

FIG. 8 illustrates exemplary waveforms 402, 404, 406, and 410 of signals on the WL 220, the discharging path 302, discharging path 304, and the output signal 205-1, respectively, and waveform 408 of the enablement signal 351, in accordance with various embodiments. More particularly, during a certain period of time while the memory device 200 (FIG. 2) is operating, waveform 402 may represent the signal over time on the WL 220; waveform 404 may represent the signal (voltage level) over time on the discharging path 302; waveform 406 may represent the signal (voltage level) over time on the discharging path 304; waveform 408 may represent the enablement signal 351 over time; waveform 410 may represent the output signal 205-1 over time. As illustrated in the embodiment of FIG. 8, at "t0," the BLs 222 and 232 are pre-charged to Vdd. At "t1," the WL 220 is asserted by the row decoder 208 (FIG. 2) and accordingly starts to transition from a logical low to a logical high. At "t2," while the cells 221 and 231 are being accessed (read) by the respective sense amplifiers 212-1 and 212-2 of the I/O circuit 212, the discharging paths 302 and 304, as described above, are formed, respectively. Accordingly, the voltage levels on the BLs 222 and 232 start to ramp down from Vdd. As described above, each discharging path is formed by one or more transistors that are intrinsically and/or extrinsically different from one another (due to manufacturing variance) such that each discharging path may have a distinct discharging rate. As shown in FIG. 8, the waveforms 404 and 406 each has a respective slope (i.e., a respective discharging rate).

Referring still to FIG. 8, at "t3," when both of the voltage levels on the BLs 222 and 232 have fallen below a trigger level 403 of the NOR gate 310 (shown in FIG. 5), the enablement signal 351 (i.e., the waveform 408) output by the pulse generator 312 is triggered from a low state to a high state. Upon the enablement signal 351 being triggered (in response to the signals on both BLs 222 and 232 falling below the NOR trigger point 403), in some embodiments, the sense amplifier 204-1 starts to detect the difference of the discharging rates of the discharging paths 302 and 304 (through the BLs 222 and 232). More specifically, after t3, every certain period of time (e.g., 100 picoseconds (ps)), the sense amplifier 204-1 retrieves the voltage levels on the discharging paths 302 and 304, and calculates the discharging rates of the discharging paths 302 and 304, respectively, through dividing the voltage levels by the period of time (100 ps in this example). As such, the discharging rates of the discharging paths 302 and 304 may be available to the sense amplifier 204-1. For example, at "t3+100 ps," the voltage level on the discharging path 302 is X volts, and at "t3+200 ps," the voltage level on the discharging path 302 is Y volts, the discharging rate of the discharging path 302 may be derived, by the sense amplifier 204-1, as (X-Y)/10 (V/ps). At "t4," following the delay period 324, the enable signal 351 (waveform 408) transitions to a logic low level, and the sense amplifier 204-1 may provide the output signal as a logical 0 (410-1) or a logical 1 (410-2).

Referring back to FIG. 3 (in conjunction with FIG. 2), in some embodiments, if the data bit stored (being written) in each of the plurality of cells is a logical 1, the nodes 302 and 306 of the cells 221 and 231 are respectively at a logical 1 state (the nodes 304 and 308 of the cells 221 and 231 are respectively at a logical 0 state), and, further, the control logic may be configured to cause the PC/PD circuit 106 to "pre-discharge" all the BLs and BBLs (222, 224, 232, and 234) to ground. Prior to, simultaneously with, or subsequent to the pre-discharging, the control logic 214 may cause the row decoder 208 to assert a WL of a row (the WL 220 in the example of FIG. 3) so as to activate (turn on) all the access transistors (e.g., M1, M6, M11, and M16). In some embodiments, the voltage level of the voltage reference 301 may be lower than Vdd such as, for example, between about 50% of Vdd and about 99% of Vdd. In response to the access transistors M1 and M11 being turned on, since the BLs 222 and 232 are pre-discharged to ground and the nodes 302 and 306 are at the logical 1 state (e.g., Vdd), a charging path 306 may be formed through the supply voltage 301, the transistor M2, and the access transistor M1 in the cell 221, and a charging path 308 may be formed through the supply voltage 301, the transistor M12, and the access transistor M11 in the cell 231, respectively. Similar to the discharging path, each charging path may have a charging rate due to the manufacturing variance on the transistors that constitute the charging path. Since the charging path is substantially similar to the discharging path, for clarity, further discussions of the charging path (and charging rate) and using the charging rate to provide a PUF signature will be omitted.

Figure 9:
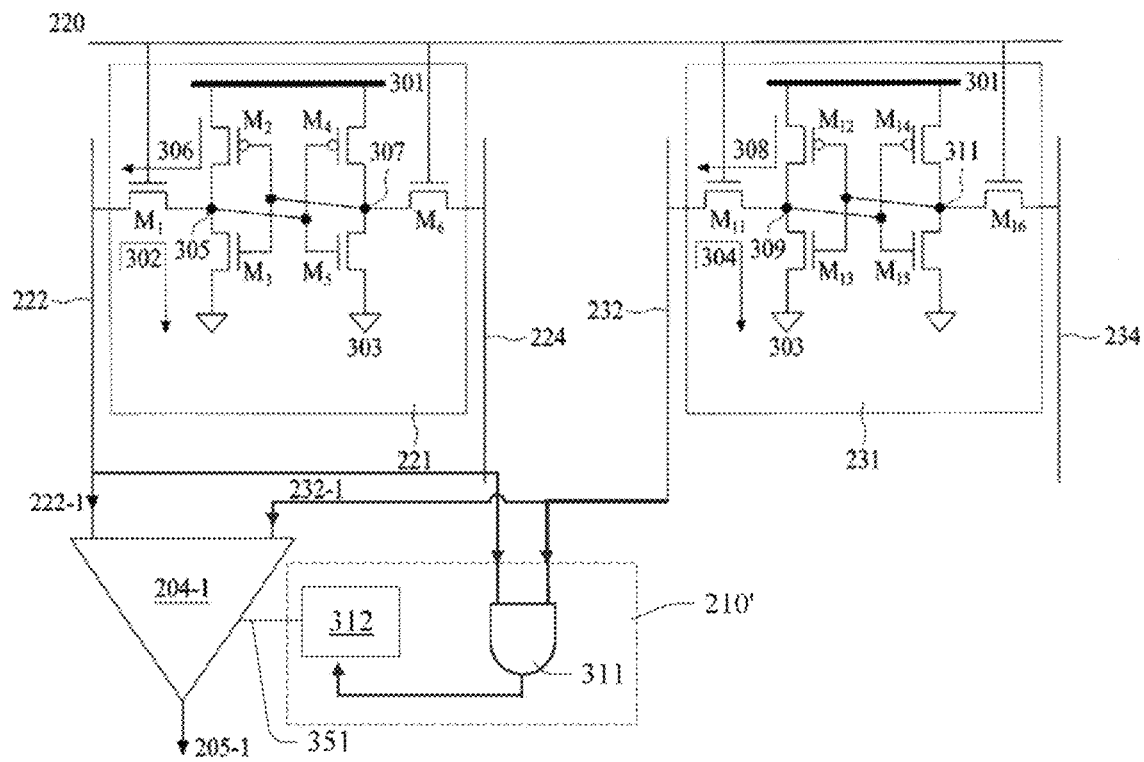
FIG. 9 is a circuit diagram illustrating another example of two memory cells of the SRAM cell array and sense amplifier of the authentication circuit of FIG. 2, and another example of the controller in accordance with some embodiments.

FIG. 9 illustrates the memory cells 221 and 231 and their coupled sense amplifier 204-1, along with another example of a controller 210', which generates the sense amplifier enable signal 351 that is received by the sense amplifier 204-1. The controller 210' shown in FIG. 9 includes an AND gate 311 having first and second input terminals coupled to the BLs 222-1 and 232-1. Thus, the AND gate 311 receives the same input signals as the sense amplifier 204-1. The output of the AND gate 311 is received by the pulse generator 312, which may be configured as shown in FIG. 6. The controller 210' provides the enable signal pulse 351 to the sense amplifier 204-1.

Figure 10:
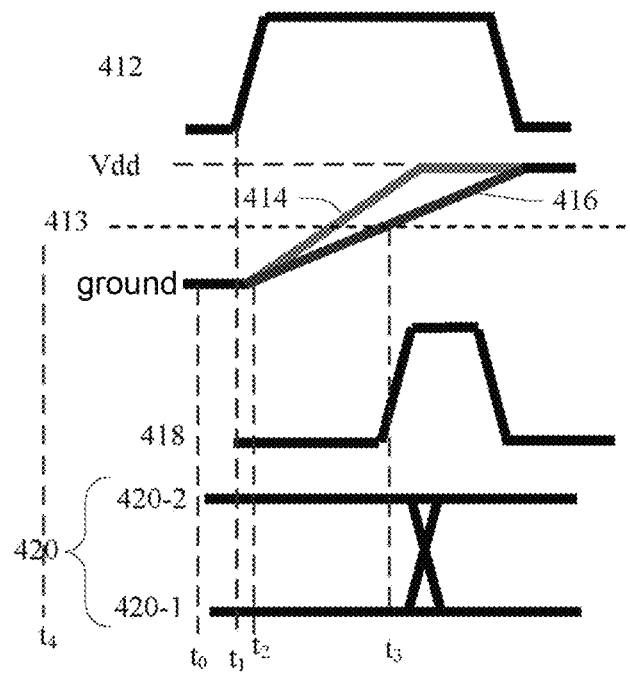
FIG. 10 illustrates examples of waveforms of signals of the circuit of FIG. 9, in accordance with some embodiments.

FIG. 10 illustrates exemplary waveforms 412, 414, 416, and 418 of signals on the WL 220, the charging path 306, the charging path 308, and the output signal 205-1, respectively, and waveform 420 of the enablement signal 351, generated by the example shown in FIG. 9. More particularly, during a certain period of time while the memory device 200 (FIG. 2) is operating, waveform 412 may represent the signal over time on the WL 220; waveform 414 may represent the signal (voltage level) over time on the charging path 306; waveform 416 may represent the signal (voltage level) over time on the charging path 308; waveform 418 may represent the enablement signal 351 over time; and waveform 420 may represent the output signal 205-1 over time.

As illustrated in the embodiment of FIG. 10, at "t0," the BLs 222 and 232 are pre-discharged to ground. At "t1," the WL 220 is asserted by the row decoder 208 (FIG. 2) and accordingly the waveform 412 starts to transition from a logical low to a logical high. At "t2," while the cells 221 and 231 are being accessed (read) by the respective sense amplifiers 212-1 and 212-2 of the I/O circuit 212, the charging paths 306 and 308, as described above, are formed, respectively. Accordingly, the voltage levels on the BLs 222 and 232 start to ramp up from ground. As described above, each charging path is formed by one or more transistors that are intrinsically and/or extrinsically different from one another (due to manufacturing variance) such that each charging path may have a distinct charging rate. As shown in FIG. 10, the waveforms 414 and 416 each has a respective slope (i.e., a respective charging rate).

Referring still to FIG. 10, at "t3," the enablement signal 351 (i.e., the waveform 418) is triggered from a low state to a high state when both of the voltage levels on the BLs 222 and 232 (wave forms 414 and 416) have risen above the trigger level 413 of the AND gate 311. Upon the enablement signal 351 being triggered, the sense amplifier 204-1 starts to detect the difference of the charging rates of the discharging paths 306 and 308 (through the BLs 222 and 232). More specifically, after t3, every certain period of time (e.g., 100 picoseconds (ps)), the sense amplifier 204-1 retrieves the voltage levels on the charging paths 306 and 308, and calculates the charging rates of the charging paths 306 and 308, respectively, through dividing the voltage levels by the period of time (10 ms in this example). As such, the charging rates of the charging paths 306 and 308 may be available to the sense amplifier 204-1. For example, at "t3+100 ps," the voltage level on the charging path 306 is X volts, and at "t3+200 ps," the voltage level on the charging path 306 is Y volts, the charging rate of the charging path 306 may be derived, by the sense amplifier 204-1, as (X-Y)/10 (V/ps). As described above, the enable signal 418 is triggered based on the respective signals on the BLs 222 and 232 falling below the trigger level 413 of the AND gate 311. At the trailing edge of the enable signal 351 (wave form 418), which is based on the delay period 324 established by the pulse generator 312, the sense amplifier 204-1 may provide the output signal as a logical 0 (420-1) or a logical 1 (420-2).

Figure 11:
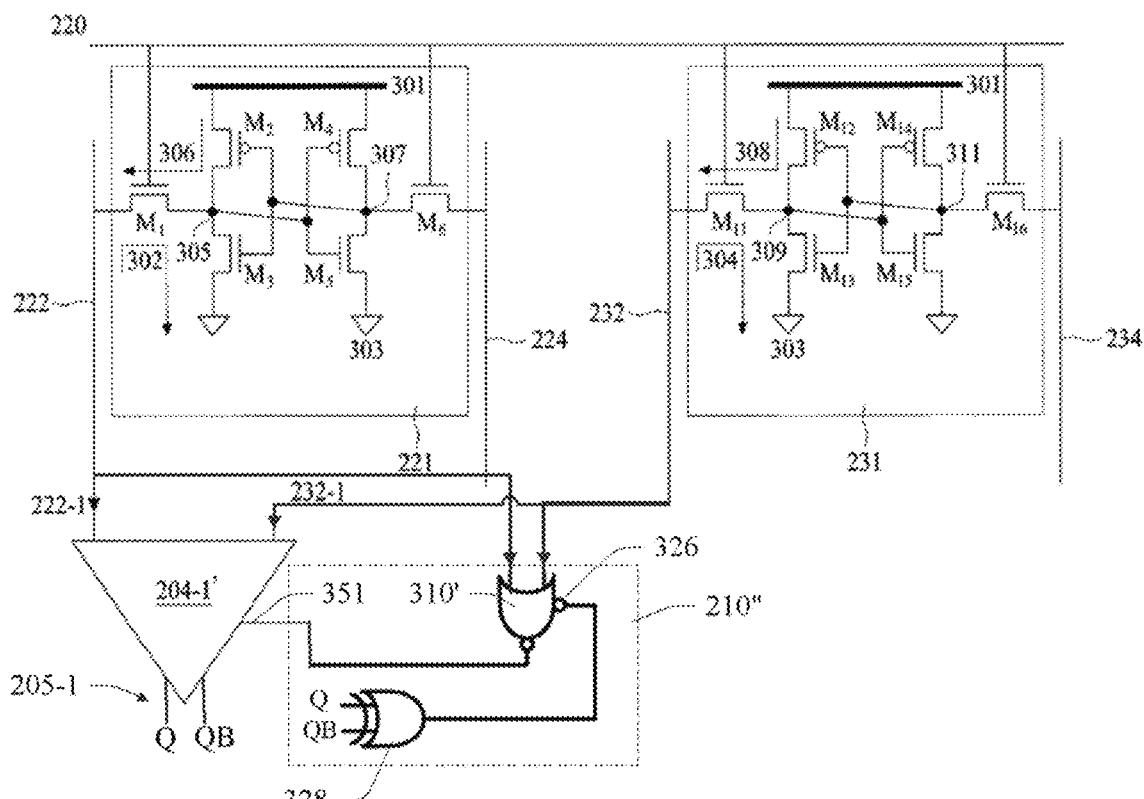
FIG. 11 is a circuit diagram illustrating another example of two memory cells of the SRAM cell array and sense amplifier of the authentication circuit of FIG. 2, and a further example of the controller in accordance with some embodiments.

FIG. 11 illustrates another example of the memory cells 221 and 231 and their coupled sense amplifier 204-1', along with a further example of a controller 210", which generates the sense amplifier enable signal 351 that is received by the sense amplifier 204-1'. In the example shown in FIG. 11, the output of the sense amplifier 204-1' includes Q and Q bar (QB) outputs. Similarly to the embodiment shown in FIG. 5, the controller 210" shown in FIG. 11 includes a NOR gate 310' having first and second input terminals coupled to the BLs 222-1 and 232-1. Thus, the NOR gate 310' receives the same input signals as the sense amplifier 204-1. The output of the NOR gate 310' is the enable signal 351 that is output to the sense amplifier 204-1. Additionally, the NOR gate 310' includes an enable terminal 326 that receives a NOR enable signal output by an XOR gate 328. The XOR gate 328 receives as its inputs the Q and QB outputs of the sense amplifier 204-1'.

Figure 12:
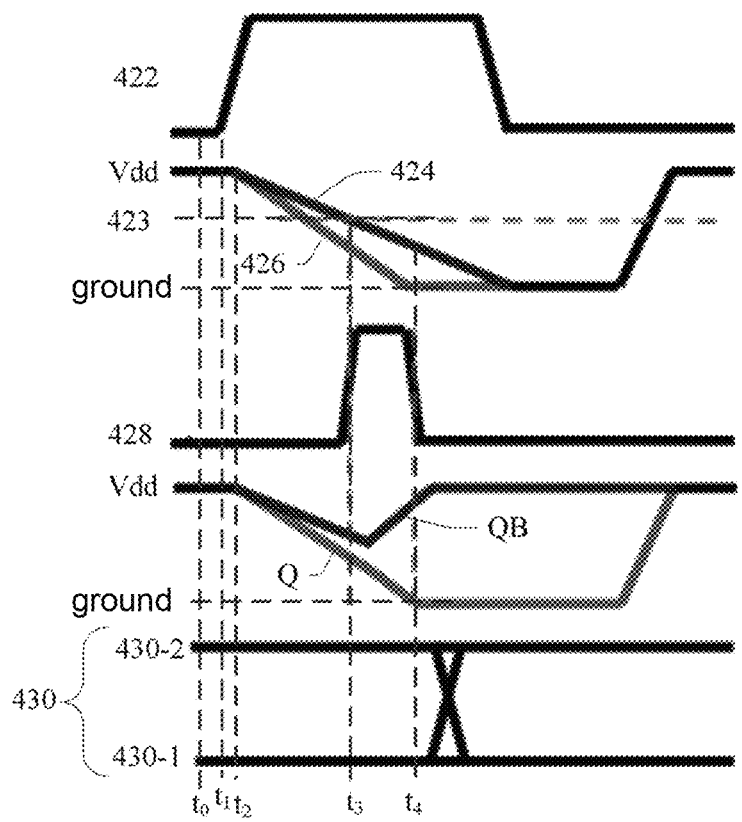
FIG. 12 illustrates examples of waveforms of signals of the circuit of FIG. 11, in accordance with some embodiments.

FIG. 12 illustrates exemplary waveforms 422, 424, 426, and 428 of signals on the WL 220, the charging path 306, the charging path 308, and the output signal 205-1, respectively, and waveform 430 of the enablement signal 351, corresponding to the example shown in FIG. 11. More particularly, during a certain period of time while the memory device 200 (FIG. 2) is operating, waveform 412 may represent the signal over time on the WL 220; waveform 414 may represent the signal (voltage level) over time on the charging path 306; waveform 416 may represent the signal (voltage level) over time on the charging path 308; waveform 418 may represent the enablement signal 351 over time; and waveform 420 may represent the output signal 205-1 over time.

As illustrated in the embodiment of FIG. 12, at "t0," the BLs 222 and 232 are pre-charged to Vdd. At "t1," the WL 220 is asserted by the row decoder 208 (FIG. 2) and accordingly starts to transition from a logical low to a logical high. At "t2," while the cells 221 and 231 are being accessed (read) by the respective sense amplifiers 212-1 and 212-2 of the I/O circuit 212, the discharging paths 302 and 304, as described above, are formed, respectively. Accordingly, the voltage levels on the BLs 222 and 232 start to ramp down from Vdd. As noted above, each discharging path is formed by one or more transistors that are intrinsically and/or extrinsically different from one another (due to manufacturing variance) such that each discharging path may have a distinct discharging rate. As shown in FIG. 12, the waveforms 424 and 426 each has a respective slope (i.e., a respective discharging rate).

At time "t3" shown in FIG. 12, when both of the voltage levels on the BLs 222 and 232 have fallen below a trigger level 423 of the NOR gate 310', the NOR gate 310' is triggered from a low state to a high state, thus initiating the enablement signal 351 shown in waveform 428. Upon the enablement signal 351 being triggered, in some embodiments, the sense amplifier 204-1 starts to detect the difference of the discharging rates of the discharging paths 302 and 304 (through the BLs 222 and 232), resulting in the Q and QB outputs shown in FIG. 12. Time "t4" shows the point where the Q and QB outputs have diverged to the point of the Q output reaching a logical low state and the QB output reaching a logical high state, whereupon the NOR enable signal goes to a low state and the sense amplifier enable signal 351 (waveform 428) transitions to a logic low level. The sense amplifier 204-1 may then provide the output signal as a logical 0 (430-1) or a logical 1 (430-2).

Figure 13:
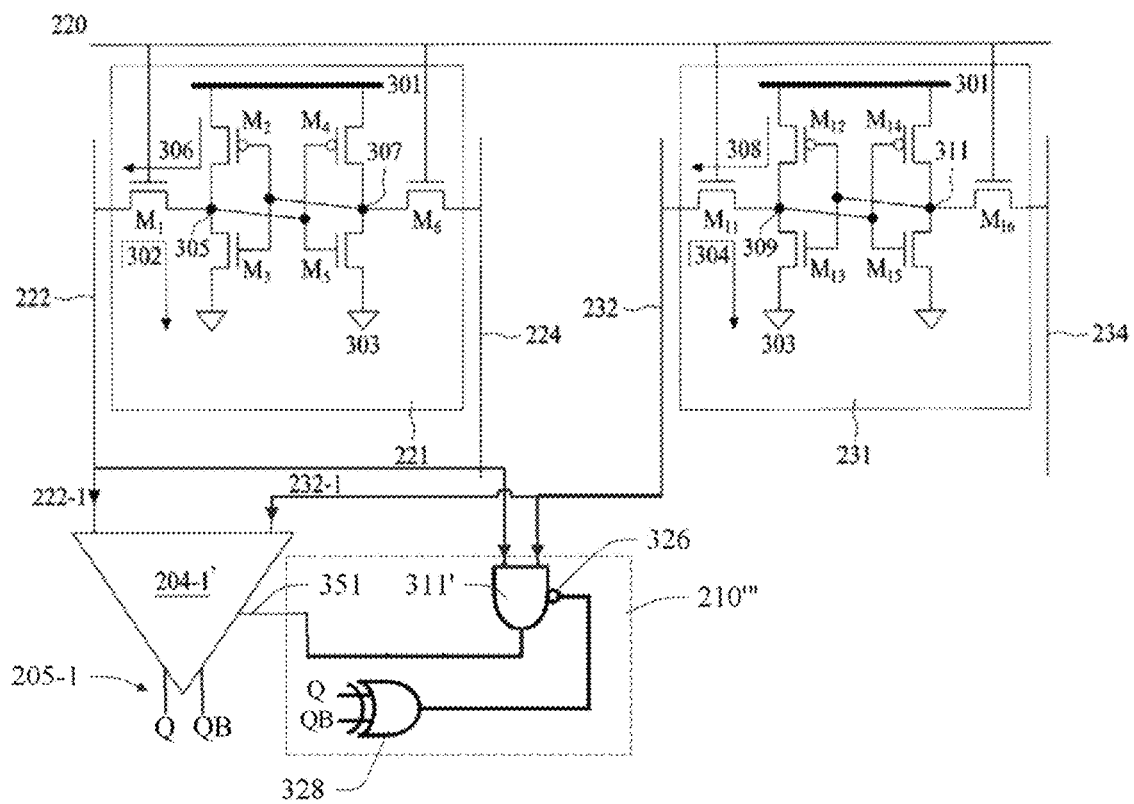
FIG. 13 is a circuit diagram illustrating another example of two memory cells of the SRAM cell array and sense amplifier of the authentication circuit of FIG. 2, and a still further example of the controller in accordance with some embodiments.

FIG. 13 illustrates another example of the memory cells 221 and 231 and their coupled sense amplifier 204-1', with a still further example of a controller 210', which generates the sense amplifier enable signal 351 that is received by the sense amplifier 204-1'. Similarly to the embodiment disclosed in conjunction with FIG. 11, in the example shown in FIG. 13 the output of the sense amplifier 204-1' includes the Q and QB outputs. The controller 210' shown in FIG. 13 includes an AND gate 311' having first and second input terminals coupled to the BLs 222-1 and 232-1, such that the AND gate 311' receives the same input signals as the sense amplifier 204-1. The output of the AND gate 311' is the enable signal 351 that is output to the sense amplifier 204-1. Additionally, the AND gate 311' includes an enable terminal 326 that receives an AND enable signal output by an XOR gate 328. The XOR gate 328 receives as its inputs the Q and QB outputs of the sense amplifier 204-1'.

Figure 14:
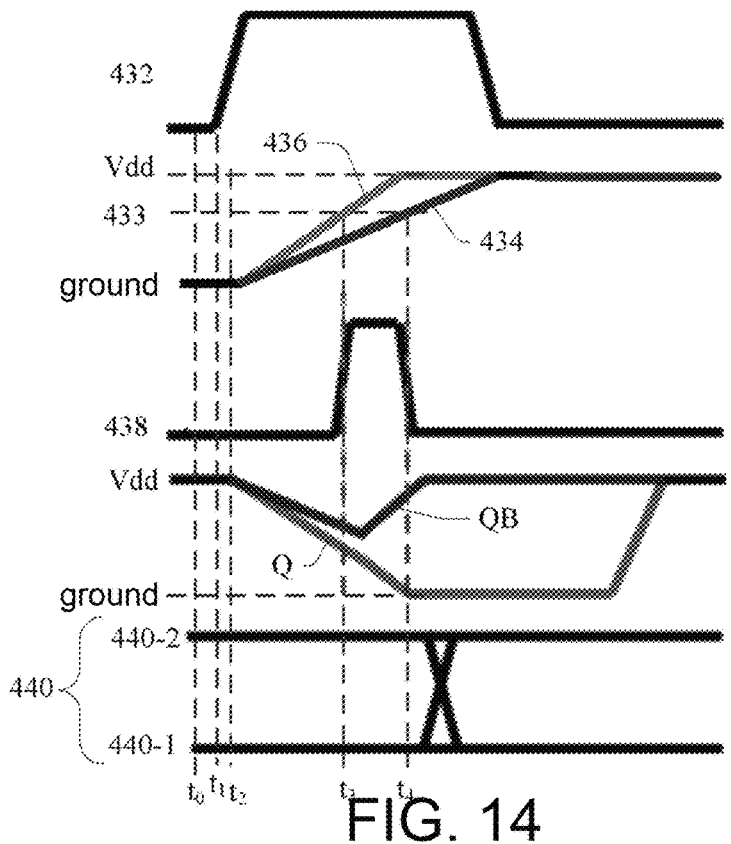
FIG. 14 illustrates examples of waveforms of signals of the circuit of FIG. 13 in accordance with some embodiments.

FIG. 14 illustrates exemplary waveforms 432, 434, 436, and 438 of signals on the WL 220, the charging path 306, the charging path 308, and the output signal 205-1, respectively, and waveform 430 of the enablement signal 351, generated by the example shown in FIG. 13. More particularly, during a certain period of time while the memory device 200 (FIG. 2) is operating, waveform 432 may represent the signal over time on the WL 220; waveform 434 may represent the signal (voltage level) over time on the charging path 306; waveform 436 may represent the signal (voltage level) over time on the charging path 308; waveform 438 may represent the enablement signal 351 over time; and waveform 430 may represent the output signal 205-1 over time.

As illustrated in the embodiment of FIG. 14, at "t0," the BLs 222 and 232 are pre-discharged to ground. At "t1," the WL 220 is asserted by the row decoder 208 (FIG. 2) and accordingly the waveform 412 starts to transition from a logical low to a logical high. At "t2," while the cells 221 and 231 are being accessed (read) by the respective sense amplifiers 212-1 and 212-2 of the I/O circuit 212, the charging paths 306 and 308, as described above, are formed, respectively. Accordingly, the voltage levels on the BLs 222 and 232 start to ramp up from ground. As described above, each charging path is formed by one or more transistors that are intrinsically and/or extrinsically different from one another (due to manufacturing variance) such that each charging path may have a distinct charging rate. As shown in FIG. 14, the waveforms 434 and 436 each has a respective slope (i.e., a respective charging rate).

At "t3," the enablement signal 351 shown by the waveform 438 is triggered from a low state to a high state when both of the voltage levels on the BLs 222 and 232 (wave forms 434 and 436) have risen above the trigger level 433 of the AND gate 311'. Upon the enablement signal 351 being triggered, the sense amplifier 204-1 starts to detect the difference of the charging rates of the discharging paths 306 and 308 (through the BLs 222 and 232), resulting in the Q and QB outputs shown in FIG. 14. Time "t4" shows the point where the Q and QB outputs have diverged to the point of the Q output reaching a logical low state and the QB output reaching a logical high state, whereupon the AND enable signal goes to a low state and the sense amplifier enable signal 351 (waveform 438) transitions to a logic low level. The sense amplifier 204-1' may then provide the output signal as a logical 0 (440-1) or a logical 1 (440-2).

Figure 15:
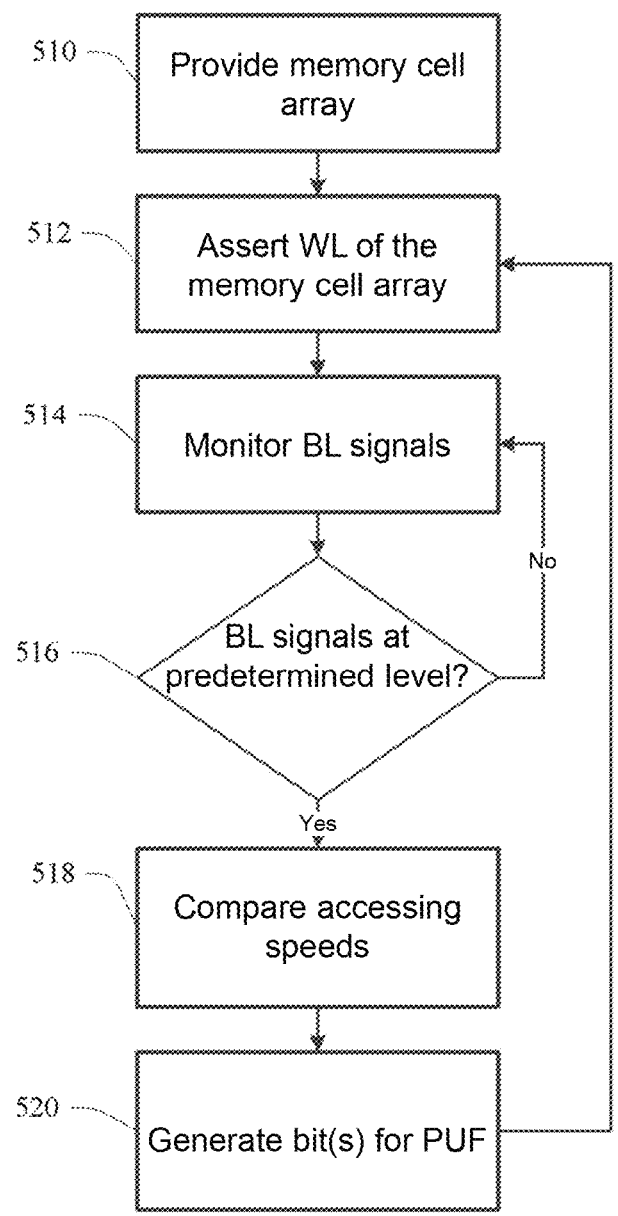
FIG. 15 is a flow diagram illustrating an example of a method of generating a PUF signature in accordance with some embodiments.

FIG. 15 is a flow chart illustrating an example of a method 500 of generating a PUF signature, such as for the SRAM cell array of FIG. 2 in accordance with various embodiments. In some embodiments, the operations of the method 500 are performed by various components of the embodiments illustrated herein.

For purposes of discussion, the following embodiment of the method 800 will be described in conjunction with FIGS. 2-4B. The illustrated embodiment of the method 800 is merely an example so that any of a variety of operations may be omitted, re-sequenced, and/or added while remaining within the scope of the present disclosure.

The method starts at operation 510, where a memory cell array such as the SRAM memory cell array 202 shown in FIG. 2, is provided. As noted above, a data bit (either a logical 1 or 0) may be written to each of the cells of the array 202. Based on the logical state of the data bit (i.e., either a logical 1 or 0) written to the cells, the bit lines of the memory cells may pre-charged Vdd, or pre-discharged to ground. At operation 512, the row decoder asserts a WL of the memory cell array based on a received row address. In some embodiments, such a row address may be provided by the control logic 214. Upon asserting the WL for the received row address, the signals on the bit lines of two memory cells of the memory array are monitored, such as by the controller 210 shown in FIG. 3. As indicated in decision block 516, the BL signals are monitored until the BL signals reach a predetermined level. In accordance with some examples disclosed herein, the predetermined level is the trigger level of the NOR or AND gates of the various controllers 210 shown herein.

When the BL signals have reached the predetermined level, the sense amplifier (e.g. 204-1, 204-2, 204-3, 204-4) of the authentication circuit 204 starts to compare reading speeds (i.e., discharging rates or charging rates) of two cells in the asserted row/WL as indicated in operation 518. For example, the sense amplifier (e.g., 204-1) of the authentication circuit 204 may compare the discharging rates of two substantially adjacent cells (e.g., 221 and 231). Or, if the logical state of the data bits written to the cells is a logical 0, the BLs and BBLs are pre-discharged to ground. As such, the sense amplifier (e.g., 204-1) of the authentication circuit 204 may compare the charging rates of those two substantially adjacent cells (e.g., 221 and 231).

In operation 520, the sense amplifier of the authentication circuit 204 generates an output bit for a PUF signature based on the comparison of the discharging or charging rates. In some embodiments, each of the sense amplifiers (e.g., 204-1, 204-2, 204-3, 204-4) of the authentication circuit 204 may simultaneously generate an output bit for the PUF signature based on the respective comparison of the discharging or charging rates on its coupled cells. As such, for a row/WL being asserted, a first plurality of output bits for the PUF signature may be generated. In some embodiments, the method 500 may again proceed to operation 512 wherein one or more other WLs are asserted so as to generate additional output bits for the PUF signature.

Among other things, by controlling the sense amplifiers 204-1, 204-2, 204-3, 204-4 based on the signals on the respective BLs, variations in BL assess speed are better tolerated, and a more stable read margin for the BLs is provided. Disclosed embodiments include a memory device, such as an SRAM memory, that has a memory cell array with a plurality of memory cells. Each of the plurality of memory cells is configured to be in a data state. A PUF generator includes a sense amplifier coupled to the plurality of memory cells. While the plurality of memory cells are being accessed, the sense amplifier is configured to compare accessing speeds of first and second memory cells of the plurality of memory cells. Based on the comparison, a first output signal for generating a PUF signature is provided. A controller is coupled to the plurality of memory cells, and the controller is configured to output an enable signal to the sense amplifier based on respective first and second signals received from the first and second memory cells.

Further embodiments include a PUF generator that includes a sense amplifier with a first input terminal configured to receive a signal from a first memory cell of a plurality of memory cells, and a second input terminal configured to receive a signal from a second memory cell of the plurality of memory cells. The sense amplifier is configured to compare accessing speeds of the first and second memory cells of the plurality of memory cells, and based on the comparison, provide a first output signal for generating a PUF signature. A controller is configured to output an enable signal to the first sense amplifier. The controller has a first input terminal configured to receive a signal from a bit line of the first memory cell and a second input terminal configured to receive a signal from a bit line of the second memory cell.

Additional embodiments include a method of generating a PUF signature. The method includes providing a memory cell array that includes a plurality of memory cells, each of which is configured to be in a data. The memory cell array has at least first and second memory cells with respective first and second bit lines. Accessing speeds of the first and second memory cells are compared in response to respective first and second signals on the first and second bit lines each reaching a predetermined level. An output signal for generating a PUF signature is provided based on the comparison of the accessing speeds of the first and second memory cells.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a memory cell array comprising a plurality of memory cells including a first memory cell and a second memory cell, wherein each of the plurality of memory cells is configured to be in a data state; and
   a physically unclonable function (PUF) generator, comprising:
      a precharge circuit configured to pre-charge first and second bit lines respectively coupled to the first and second memory cells to a predetermined pre-charge level;
      a first sense amplifier having a first input terminal coupled to the first bit line of the first memory cell and a second input terminal coupled to the second bit line of the second memory cell, wherein while the plurality of memory cells are being accessed, the first sense amplifier is configured to compare accessing speeds of the first and second memory cells of the plurality of memory cells, provide a first output signal for generating a PUF signature based on charging or discharging rates of the first and second memory cells in response to the comparison of the accessing speeds of the first and second memory cells; and
      a first control circuit coupled to the plurality of memory cells, wherein the first control circuit is configured to output an enable signal to the first sense amplifier based on respective first and second signals received from the first and second memory cells.

2. The memory device of claim 1, wherein:
   the first control circuit has a first input terminal coupled to the first bit line of the first memory cell and a second input terminal coupled to the second bit line of the second memory cell.

3. The memory device of claim 2, wherein the first control circuit is configured to generate the enable signal in response to respective first and second signals on the first and second bit lines each reaching a first predetermined level.

4. The memory device of claim 2, wherein the first control circuit is configured to generate the enable signal having a pulse with a leading edge based on respective first and second signals on the first and second bit lines each reaching a first predetermined level.

5. The memory device of claim 4, wherein the first control circuit is configured to generate the enable signal having the pulse with a trailing edge based on the first and second signals each reaching a second predetermined level.

6. The memory device of claim 5, wherein the controller first control circuit is configured to generate the enable signal having the pulse with a trailing edge based on an output of the first sense amplifier.

7. The memory device of claim 2, wherein the first control circuit includes:
   a NOR gate having the first and second input terminals of the first control circuit, and
   a pulse generator configured to generate the enable signal in response to an output of the NOR gate.

8. The memory device of claim 2, wherein the first control circuit includes:
   an AND gate having the first and second input terminals of the first control circuit, and
   a pulse generator configured to generate the enable signal in response to an output of the AND gate.

9. The memory device of claim 1, wherein the PUF generator further comprises:
   a second sense amplifier coupled to the plurality of memory cells, wherein while the plurality of memory cells are being accessed, the second sense amplifier is configured to compare access speeds of third and fourth memory cells of the plurality of memory cells that are substantially adjacent to each other, and based on the comparison, provide a second output signal for generating the PUF signature;

a second control circuit coupled to the plurality of memory cells, wherein the second control circuit is configured to output an enable signal to the second sense amplifier based on respective first and second signals received from the third and fourth memory cells.

10. The memory device of claim 1, wherein the PUF generator further comprises:

a second sense amplifier coupled to the plurality of memory cells, wherein while the plurality of memory cells are being accessed, the second sense amplifier is configured to compare access speeds of third and fourth memory cells of the plurality of memory cells that are substantially adjacent to each other, and based on the comparison, provide a second output signal for generating the PUF signature;

wherein the first control circuit is configured to output the enable signal to the second sense amplifier based on respective first and second signals received from the first and second memory cells.

11. A physically unclonable function (PUF) generator, comprising:

a first sense amplifier having a first input terminal connected to a first bit line and configured to receive a signal from a first memory cell of a plurality of memory cells and a second input terminal connected to a second bit line and configured to receive a signal from a second memory cell of the plurality of memory cells;

a precharge circuit configured to pre-charge the first and second bit lines to a predetermined pre-charge level, wherein the first sense amplifier is configured to compare accessing speeds of the first and second memory cells of the plurality of memory cells in response to respective first and second signals on the first and second bit lines each reaching a predetermined level, and, provide a first output signal for generating a PUF signature based on charging or discharging rates of the first and second memory cells in response to the comparison of the accessing speeds of the first and second memory cells; and a first control circuit configured to output an enable signal to the first sense amplifier, the first control circuit having a first input terminal configured to receive a signal from the first bit line of the first memory cell and a second input terminal configured to receive a signal from the second bit line of the second memory cell.

12. The PUF generator of claim 11, further comprising:

a second sense amplifier having a first input terminal configured to receive a signal from a third memory cell of the plurality of memory cells and a second input terminal configured to receive a signal from a fourth memory cell of the plurality of memory cells, wherein the second sense amplifier is configured to compare accessing speeds of the third and fourth memory cells of the plurality of memory cells, and based on the comparison, provide a second output signal for generating the PUF signature; and a second control circuit configured to output an enable signal to the second sense amplifier, the second control circuit having a first input terminal configured to receive a signal from a third bit line of the third memory cell and a second input terminal configured to receive a signal from a fourth bit line of the fourth memory cell.

13. The PUF generator of claim 11, further comprising:

a second sense amplifier having a first input terminal configured to receive a signal from a third memory cell of the plurality of memory cells and a second input terminal configured to receive a signal from a fourth memory cell of the plurality of memory cells, wherein the second sense amplifier is configured to compare accessing speeds of the third and fourth memory cells of the plurality of memory cells, and based on the comparison, provide a second output signal for generating the PUF signature; and wherein the control circuit is configured to output the enable signal to the second sense amplifier.

14. The PUF generator of claim 12, wherein:

the first control circuit is configured to generate the enable signal in response to the respective first and second signals on the first and second bit lines each reaching a first predetermined level; and the control circuit is configured to generate the enable signal in response to respective third and fourth signals on the third and fourth bit lines each reaching the first predetermined level.

15. The PUF generator of claim 13, wherein:

the first control circuit is configured to generate the enable signal in response to respective first and second signals on the first and second bit lines each reaching a first predetermined level; and the second control circuit is configured to generate the enable signal in response to the respective first and second signals on the first and second bit lines each reaching the first predetermined level.

16. A method of generating a physically unclonable function (PUF) signature, comprising:

providing a memory cell array comprising a plurality of memory cells wherein each of the plurality of memory cells is configured to be in a data state, the memory cell array including first and second memory cells having respective first and second bit lines;

pre-charging the first and second bit lines to a predetermined pre-charge level;

comparing accessing speeds of the first and second memory cells in response to respective first and second signals on the first and second bit lines each reaching a predetermined level; and providing a first output signal for generating a PUF signature based on charging or discharging rates of the first and second memory cells in response to the comparison of the accessing speeds of the first and second memory cells.

17. The method of claim 16, wherein the memory cell array includes third and fourth memory cells having respective third and fourth bit lines, the method further comprising:

comparing accessing speeds of the third and fourth memory cells in response to respective third and fourth signals on the third and fourth bit lines reaching the predetermined level; and providing a second output signal for generating the PUF signature based on the comparison of the accessing speeds of the third and fourth memory cells.

18. The method of claim 16, wherein the memory cell array includes third and fourth memory cells having respective third and fourth bit lines, the method further comprising:

comparing accessing speeds of the third and fourth memory cells in response to the first and second signals on the first and second bit lines each reaching the predetermined level; and providing a second output signal for generating the PUF signature based on the comparison of the accessing speeds of the third and fourth memory cells.

19. The method of claim 16, further comprising predischarging the first and second bit lines to a predetermined predischarge level before comparing accessing speeds.

20. The method of claim 16, wherein comparing the accessing speeds of the first and second memory cells in response to the respective first and second signals on the first and second bit lines each reaching a predetermined level includes connecting the first bit line of the first memory cell to a first input of a sense amplifier and connecting the second bit line of the second memory cell to a second input of the sense amplifier.

* * * * *